Patented Jan. 19, 1932

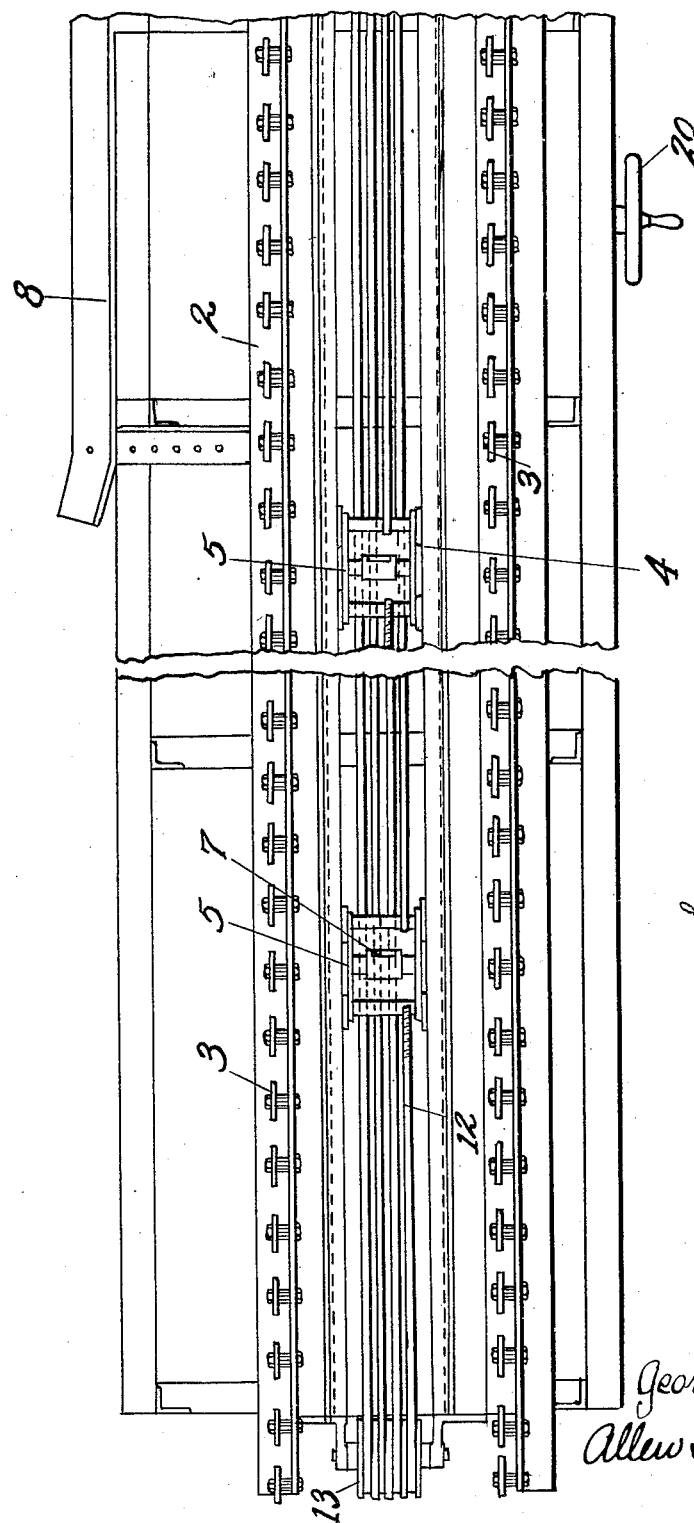

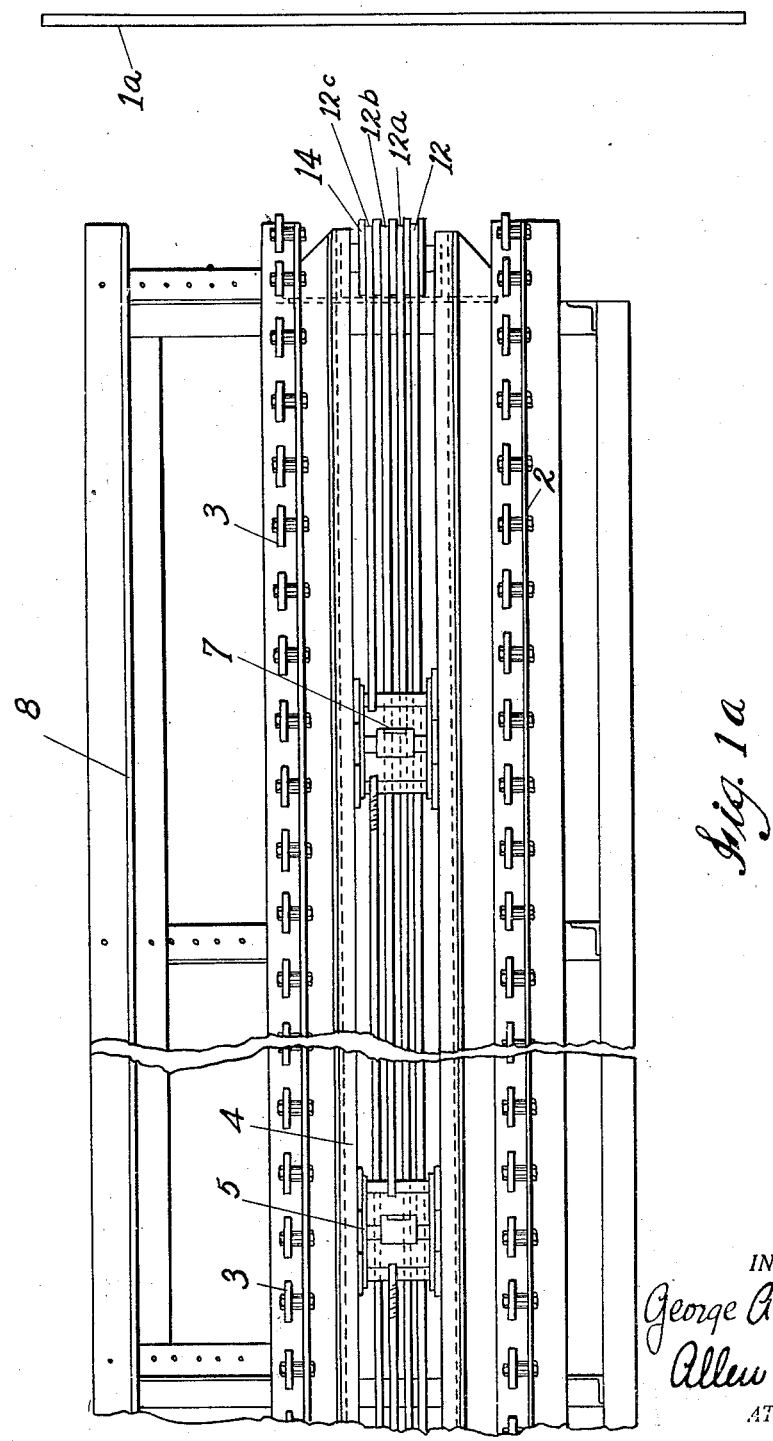

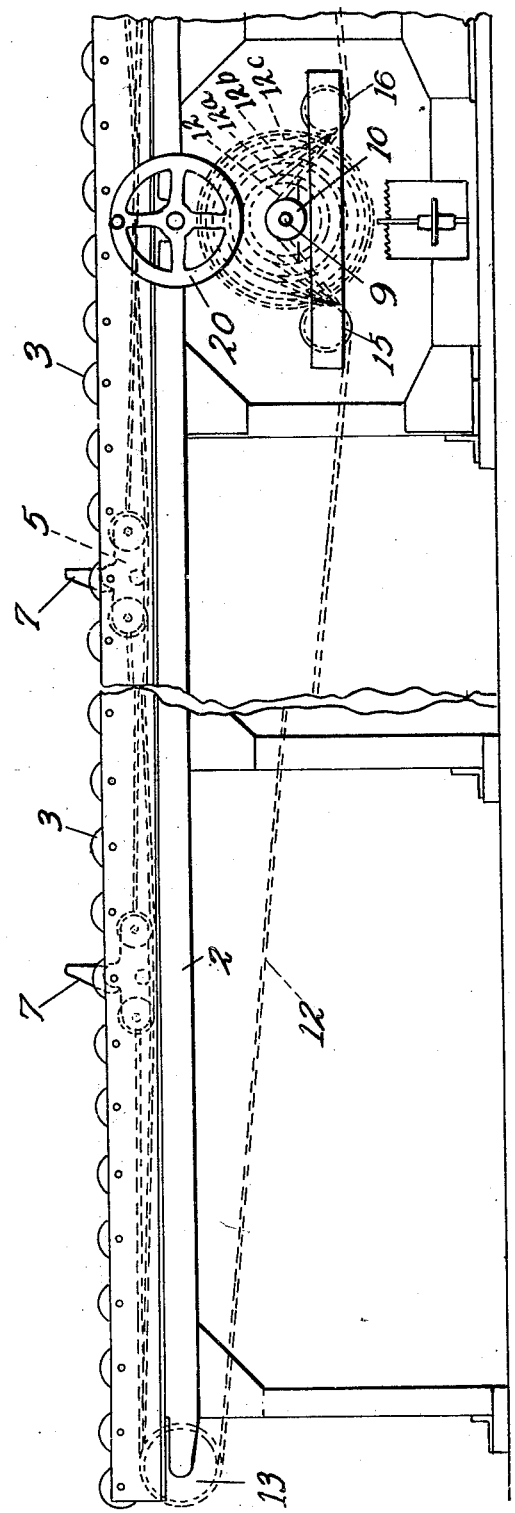

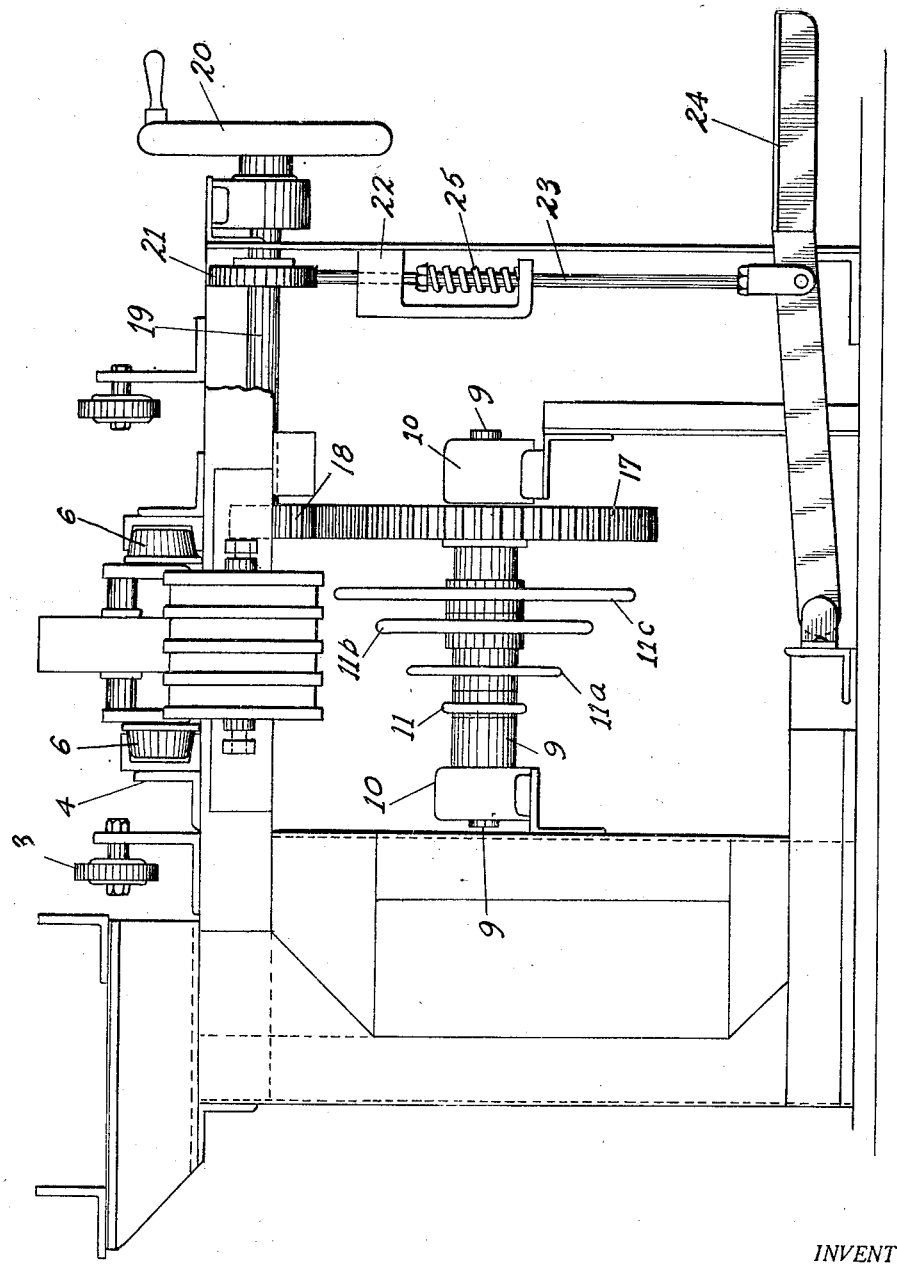

1,842,202

UNITED STATES PATENT OFFICE

GEORGE A. REEVE, OF ASHLAND, KENTUCKY, ASSIGNOR TO THE AMERICAN ROLLING MILL COMPANY, OF MIDDLETOWN, OHIO, A CORPORATION OF OHIO

PROPORTIONAL GAUGE FOR DIVIDING STRIP MATERIAL

Application filed March 16, 1929. Serial No. 347,646.

My invention will be addressed, in the exemplary embodiment which I shall presently describe, to the provision of a dividing gauge for rough sheet bars, although it will have application to the dividing of lengths of other material into proportional pieces.

My object is to provide a cutting gauge for strip material which will be semi-automatic in its operation and which will provide means for cutting any length of material into a given number of equal pieces or into a given number of pieces which have some other proportional relation to each other.

It is an object of my invention to provide, for this purpose, a simple and easily controlled device which is not liable to maladjustment, and is sturdy and very accurate.

It is a further object of my invention to provide dividing means of this character in which the proportional moving elements act as positive gauges in the cutting operation and are not mere marking gauges for a subsequent operation.

These and other objects of my invention which will be pointed out hereinafter or will be apparent to one skilled in the art who reads these specifications, I accomplish by that certain construction and arrangement of parts of which I shall now describe a preferred embodiment, reference being had to the drawings which accompany these specifications.

In the drawings:

Figures 1 and 1A, taken together, show a plan view of my gauge.

Figures 2 and 2A show a side elevation thereof.

Figure 3 is an end elevation of the portion of the roller table which contains the mechanism controlling the differential movement of the several stops.

Figure 2A:
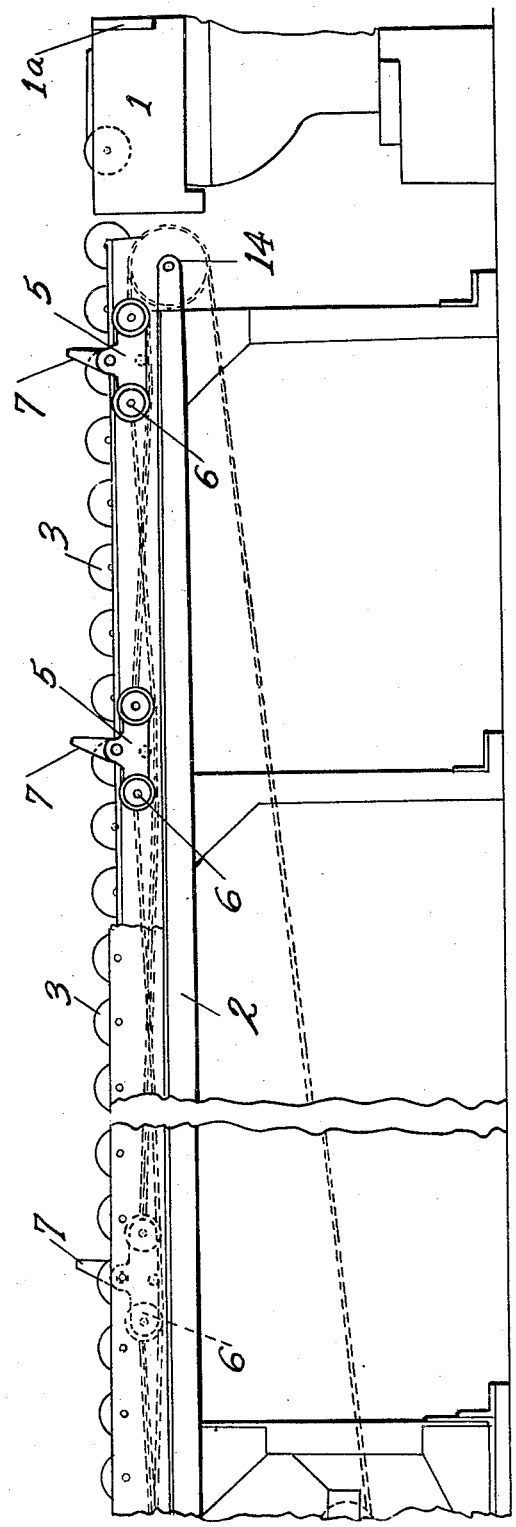

Proportional dividers which form guides, for the marking of material to be cut, are old. In my invention, I make use of differentially moving elements which serve as stops in the cutting of heavy metal pieces of considerable length. For this purpose, great accuracy of movement must be combined with the utmost rigidity, and for this reason the mechanical movements ordinarily employed in proportional dividers are not satisfactory. For example, the familiar lazy tongs does not possess the required rigidity, accuracy and durability. In my construction, I provide a shear table equipped with a series of stops arranged for proportional movement of a predetermined character, and I provide not only for the easy and rapid movement of the series of stops but also for great rigidity and sturdiness therein to the end that they may be used as the gauges for the shear. In the several figures I have indicated at 1 a shear mechanism in which the lower shear knife is indicated at 1A. A shear table having a frame 2 supported upon suitable standards is preferably equipped with a series of disc rollers 3 suitable for the guiding of rough sheet bar stock for cutting. There will preferably be at least two rows of disc rollers, and between them I locate my differentially moving stops. For this purpose I provide tracks 4 and stops moving along the tracks upon carriages 5 equipped with wheels 6 engaging the track. Stop members 7 are pivoted upon the carriages and extend up above the level of the disc rollers so as to be effective as stops for sheet bar stock placed thereon. The stops can rotate freely (in Figs. 2 and 2A) in a clockwise direction, but means upon the carriages are provided to limit the movement of the stops in a counter clockwise direction so that they can not turn beyond the vertical position. These means may be any desired. As an example, the stops may be so shaped that a dog thereon engages a portion of the carriage to prevent counter clockwise rotation beyond the vertical. The lower end of the stops may be weighted, or the stops may be provided with springs, or other means taken to cause the stops normally to return to the vertical position. Along side the shear table I provide an abutment or squaring gauge 8. I also provide means for the differential movement of the carriages. This movement in the preferred embodiment shown is a geometrical proportion in which each succeeding carriage moves twice as far as the carriage next preceding, and is adapted for dividing sheet bar stock of varying lengths into an equal number of pieces of equal length.

The manner of use of the gauge is as follows: A piece of sheet bar stock is led over the table (in the embodiment of the figures) from left to right and the right end thereof is aligned with the shearing edge of the knife 1A. The piece of stock is next squared with the abutment 8 by being pushed against it, its end still being in alignment with the shearing knife. In its traverse over the table, the stock will have pushed the stops downward out of the way and will have ridden over them. The carriages are next differentially moved until the one furthest to the left is brought with its stop against the end of the sheet. If the length of the stock was such with relation to the then position of the several stops that the stop lying furthest to the left was beneath it, then the carriages would be moved far enough to the left so that the end stop would clear the end of the stock. Then that stop would be brought up against the end of the stock. The stops are then locked in that position and the stock moved forward across the shearing table until its end clears the second stop. The stock will then be moved back against this stop and a shear cut made. Next the stock will be moved forward until it clears the third stop, and a second cut made. Then the stock will be moved forward until it clears the fourth stop and a third cut made, and so on. In the embodiment shown, I have provided four stops for cutting sheet bar stock into four sheet bars of equal lengths irrespective of the original length of the shear bar stock providing it is within the length of the cutting table.

I will now describe the mechanism which I provide for the differential movement of the stops. Beneath the table I provide a shaft 9 suitably supported in bearings 10 on the frame. To this shaft are keyed or otherwise fastened rigidly a series of sprockets 11, 11A, etc., which are of different sizes. Each carriage is controlled by a chain 12, 12A, etc., one chain being fastened to each of the carriages and riding under the remainder thereof along the table top, where it may be, if desired, supported by suitable idlers not shown. Idlers 13 and 14 are provided at the ends of the table, and at the control point idlers 15 and 16 are provided beneath which the chains are carried before they reach the series of sprockets 11, 11A, etc. The shaft 9 carries a gear 17 meshing with a pinion 18 upon the shaft 19 of a hand wheel 20, used to move the shaft; and a locking means is provided comprising a toothed wheel 21 and a pawl 22 actuated by a shaft 23. At the lower end of the shaft is a hinged treadle 24 adapted to move the shaft downwardly and a spring 25 is provided which engages a stop on the frame at its lower end and a nut on the shaft at its upper end so as to force the shaft upwardly whereby the pawl may engage the toothed wheel 21. It will be clear that an operator may move the carriages 5 by first depressing the treadle 24 thereby unlocking the hand wheel 20, and then turning the hand wheel 20 thereby rotating the shaft 9 with its sprockets. It will further be clear that if the sprockets bear to each other a proportional relationship of diameters, the carriages will be moved relatively to each other in the same proportion. In the embodiment shown the sprocket 11 has 22 teeth; the sprocket 11A—44 teeth; the sprocket 11B—66 teeth; and the sprocket 11C—88 teeth. This relationship causes the carriages to move so as to divide any length of sheet bar stock into four parts of equal length. Some other relationship of sprocket size may be adopted to enable my dividing means to be used to cut pieces having a length relationship in some other proportion.

It will be clear that my invention may be modified in a number of ways without departing from the spirit thereof in its broadest aspect. The means taken to cause the differential movement of the carriages may be other than a series of sprockets upon a shaft, operating upon chains to each carriage. Thus the carriages may each be mounted upon a separate threaded shaft, and means taken to drive the shafts differentially if the threads thereon are of the same pitch, or to drive the shafts at equal speeds if the threads thereon are of different pitches. Driving sprockets of the same size may be used if proportional gearing is arranged to drive them at proportional speeds, and the like. A shear gauge however, for use with heavy work such as sheet bar stock, must have a proportional drive which not only is very rugged but is not liable to maladjustment or lost motion. I avoid these difficulties in the particular construction shown, which is preferred by me. A motor may, of course, be substituted for the hand wheel.

Having thus described my invention, what I claim as new and desire to secure by Letters Patent, is:—

1. In a gauge for proportional cutting, a shear table, carriages arranged for lengthwise movement along said table and means for moving said carriages in accordance with a predetermined proportional relationship, said means comprising separate chains attached to each of said carriages and means for driving said chains at proportional speeds.

2. In a gauge for proportional cutting, a shear table, carriages arranged for lengthwise movement along said table and means for moving said carriages in accordance with a predetermined proportional relationship, said means comprising separate chains attached to each of said carriages and means for driving said chains at proportional speeds, said driving means comprising a shaft, a series of sprockets upon said shaft, each meshing with one of said chains, the size of said sprockets varying in accordance with the said proportional relationship, and means for driving said shaft.

3. In a gauge for proportional cutting, a shear table, carriages arranged for lengthwise movement along said table and means for moving said carriages in accordance with a predetermined proportional relationship, said means comprising separate chains attached to each of said carriages and means for driving said chains at proportional speeds, said driving means comprising a shaft, a series of sprockets upon said shaft, each meshing with one of said chains, the size of said sprockets varying in accordance with the said proportional relationship, and means for driving said shaft, said driving means comprising a hand wheel actuating a pinion meshing with a gear on said shaft, and means for locking said hand wheel.

4. In a gauge for proportional cutting, a shear table comprising interspaced rows of disc rollers, stop means arranged for longitudinal movement intermediate said rows of rollers, and means for effecting the movement of said stop means in accordance with a predetermined proportional relationship.

5. In a gauge for proportional cutting, a shear table comprising interspaced rows of disc rollers, stop means arranged for longitudinal movement intermediate said rows of rollers, and means for effecting the movement of said stop means in accordance with a predetermined proportional relationship, said stop means comprising dogs adapted to be depressed by the movement of stock to be cut in one direction but adapted to serve as stops limiting the movement thereof in the other direction.

6. In a gauge for proportional cutting, a shear table comprising interspaced rows of disc rollers, stop means arranged for longitudinal movement intermediate said rows of rollers, and means for effecting the movement of said stop means in accordance with a predetermined proportional relationship, said stop means comprising dogs adapted to be depressed by the movement of stock to be cut in one direction but adapted to serve as stops limiting the movement thereof in the other direction, said driving means comprising a series of chains, one attached to each stop means and means to move said chains in accordance with said proportional relationship.

7. In a gauge for proportional cutting, a shear table comprising conveying means and a track running longitudinally of said table, a series of carriages operating on said track, stop means pivoted on said carriages and arranged to permit movement of stock over said table in one direction but to limit its movement in the other direction, and means for moving said carriages in accordance with a predetermined proportional relationship, said means comprising a series of endless chains each attached to one of said carriages, said chains operating over idlers at the ends of said table and brought back underneath it, a shaft with a series of sprockets thereon, each sprocket engaging one of said chains, said sprockets bearing to each other a relationship of diameters equivalent to said proportional relationship, and means for driving and locking said shaft.

GEORGE A. REEVE.